(12) United States Patent
Yan

(10) Patent No.: US 7,523,116 B2
(45) Date of Patent: Apr. 21, 2009

(54) SELECTION OF OPTIMAL EXECUTION ENVIRONMENT FOR SOFTWARE APPLICATIONS

(75) Inventor: Shunguo Yan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1171 days.

(21) Appl. No.: 10/697,864

(22) Filed: Oct. 30, 2003

(65) Prior Publication Data

US 2005/0097082 A1 May 5, 2005

(51) Int. Cl.
G06F 17/30 (2006.01)
(52) U.S. Cl. .................. 707/100; 707/102; 707/104.1
(58) Field of Classification Search ............... 707/1–10, 707/100–104.1, 200–206; 709/105, 226; 717/114, 121, 122, 140, 159, 163, 169, 174, 717/177, 178
See application file for complete search history.

(56) References Cited

U.S. PATENT DOCUMENTS 6,433,794 B1 8/2002 Beadle et al.
2003/0154284 A1* 8/2003 Bernardin et al. ........... 709/226
2003/0191795 A1* 10/2003 Bernardin et al. ........... 709/105

OTHER PUBLICATIONS

JAR File Specification, http://java.sun.com/j2se/1.3/docs/guide/jar/jar.html, 1999, Sun Microsystems, Inc.

* cited by examiner

*Primary Examiner*—Diane Mizrahi
(74) *Attorney, Agent, or Firm*—Anthony V S England; Herman Rodriguez; Joseph P. Lally

(57) ABSTRACT

A system for selecting a compatible environment for executing an application on a data processing system that has two or more execution environments installed includes retrieving information that indicates a set of execution environments that are compatible with a particular application. The system's files are searched to find one or more of the compatible environments on the system. If multiple compatible execution environments are found, one of the execution environments is selected for executing the application. If no compatible environment is found, an alert is issued. The compatible execution environment information may be a prioritized list of execution environments. In such a case, the highest priority execution environment found on the system is selected. In one embodiment, the application is a Java® application and the execution environments comprise Java® runtime environments. The compatible execution environments may be provided via a JAR file manifest or via a JNLP file.

11 Claims, 5 Drawing Sheets

```xml
<?xml version="1.0" encoding="utf-8"?>
<!-- JNLP File for Demo Application -->
<jnlp
  spec="1.0+"
  codebase="http://www.ibm.com/java/jnpl/apps"
  href="demo.jnlp">
  <information>
    <title>Demo Application</title>
    <vendor>IBM Corporation</vendor>
    <homepage href="help/help.html"/>
    <description> Demo Application</description>
    <description kind="short">A demonstratoin application.</description>
    <icon href="images/demo.jpg"/>
    <icon kind="splash" href="images/splash.gif"/>
    <offline-allowed/>
  </information>
  <security>
      <all-permissions/>
  </security>
  <resources>
    <j2se version="1.4"/>         <-- 308
    <j2se version="1.3.2"/>
    <j2se version="1.3.1_01" href="http://www.ibm.com/java/jre/1.3.1"/>
    <jar href="lib/demo.jar"/>
  </resources>                                                          307
  <application-desc main-class="Demo"/>
</jnlp>
```

SELECTION OF OPTIMAL EXECUTION ENVIRONMENT FOR SOFTWARE APPLICATIONS

BACKGROUND

1. Field of the Present Invention

The present invention is in the field of networked data processing systems and more particularly systems having multiple execution environments.

2. History of Related Art

In the field of networked computing, the Java® programming language developed by Sun Microsystems is well known. Java® applications are designed to be platform independent, meaning that they will function properly on any Java® enabled system, regardless of the underlying hardware or operating system software. Platform independence is achieved by installing or otherwise provisioning a data processing system with a Java® runtime environment (JRE). A JRE includes all the software needed to interpret or execute Java® code. Typically a Java® source program is compiled to create one or more Java® "class" files. The class file is comprised of architecture neutral byte codes. The byte codes in a class file are interpreted by a Java® virtual machine (JVM) that comprises a portion of the JRE. The JRE effectively insulates the Java® application from the system's operating system and software.

JREs are developed and distributed by a variety of vendors and are typically distributed without charge or at a de minims charge. Java® applications are prevalent in virtually all networked environments including the Internet and wireless communication networks. As a result, most systems that do any significant amount of networked processing have at least one installed version of a JRE.

All JREs are not, however, the same. JREs come in different revisions and versions and from different sources. Java® applications are typically developed using a particular JRE (the development JRE). When the compiled application is installed and executed either locally or via a network, the JRE on the user's system that will be used to execute the application may not be compatible with the development JRE. If the two JREs have significant or sometimes even minor incompatibilities, improper functioning of the application may result. Moreover, the local system may have multiple JREs within its file system. For a person not skilled in the Java®-based computing, being aware of JRE incompatibility issues and taking appropriate action to obviate them can be difficult, tedious, or even beyond the person's ability. Accordingly, it would be desirable to implement a data processing network, mechanism, and method for determining which if any execution environment is appropriate for a particular application.

Turning now to the drawings, FIG. 1 illustrates selected elements of a data processing system 100. In the depicted embodiment, the software elements of system 100 include an operating system 102, a set of Java® runtime environments 104-1 through 104-3 (generically or collectively referred to herein as JRE(s) 104), and a set of applications 106-1 through 106-3 (generically or collectively referred to herein as application(s) 106). Hardware elements (not depicted) of system 100 include a microprocessor having access to a system memory or some other form of storage and an I/O device such as a display screen, keyboard, keypad, pointing device, and the like as will be familiar to those knowledgeable in data processing system design. System 100 may be implemented as a conventional multiprocessor server, a conventional desktop or notebook personal computer, a network computer, or any number of network devices including cell phones, hand-held or pocket PCs, personal digital assistants (PDAs), and so forth.

As depicted in greater detail in FIG. 2, each JRE 104 includes the elements needed to execute a Java® application on a data processing system. These elements include a Java® virtual machine (JVM) 110, Java® API's 120, user interface toolkits 130, and deployment agents including Java® Web Start agent 140 and Java® Plug-in 150, all of which are standard JRE elements available from multiple sources including Sun Microsystems. JVM 110 enables platform independence of Java® code and Java® application by interpreting compiled Java® objects (class files) for the operating system 100. JVM 110 insulates application programs from the underlying platform (operating system and hardware) by converting the platform independent byte codes or class files to native code. The API's 120 provide interfaces needed to build and execute Java® applications and applets (Java® applications that execute within a browser framework). Toolkits 130 provide user interaction extensions to the developer. Web Start agent 140 provides a mechanism for executing network-distributed applications outside the confines of a web browser. Java® Plug-in 145 enables a browser to invoke a locally installed JVM to handle a Java® applet.

As shown in FIG. 1, it is not uncommon to encounter systems on which two or more JREs are installed. In some cases, developers and users have intentionally installed various JRE versions. In other cases, JREs may be installed automatically such as when the users install other application products. Regardless of how the plurality of JREs were installed, the presence of more than one JRE can lead to unintended results when applications are executed locally or via a network. In some cases, different JREs are simply incompatible with each other. In other cases, JREs developed by different vendors may have subtle execution differences. These incompatibility issues are especially noticeable when the JREs include vendor specific Java® extensions. In any event, it is generally desirable to execute an application within the same environment in which the application was developed or, at least, in an environment that is highly compatible.

When a JRE or an application that contains a JRE is installed, the system's "PATH" environment variable is often modified to add directories pointing to the JRE and other needed executable commands in a manner that varies among different applications and vendors. The PATH variable is often used to search for executables when a program is launched. If the proper command is not found, the program cannot be executed. In a conventional Java® implementation, for a system with multiple JREs, the user may need to specify the JRE path either through the command line in the case of a standalone Java application or through a Web Start Application Manager panel in the case of a networked Java application. In the case of standalone application, failure to properly specify the correct JRE path explicitly will prompt the application to search for a JRE from the directories specified in the PATH variable. The application will execute within the first JRE that it finds as it proceeds through the directories specified in the PATH variable. If the first-found JRE is incompatible, the application will fail to execute as intended even though a compatible JRE may exist in another PATH directory (i.e., a path directory that has not been searched yet). In the case of the network application invoked via Web Start, the Web Start will try to automatically download the appropriate JRE from the vendor's web site to the system if the desired JRE is not specified. Casual users of Java® may find it difficult to determine an appropriate JRE on a system having multiple JREs. The present invention, as set forth below, addresses these drawbacks of conventional Java® implementations by describing a system and method that select the most appropriate JRE for any given application without user interaction.

SUMMARY OF THE INVENTION

The objective identified above is addressed by a method and system according to the present invention for selecting a compatible environment for executing an application on a data processing system that has two or more installed execution environments. Information that indicates a set of execution environments that are compatible with a particular application is retrieved. The system's files are searched to find one or more of the compatible environments on the system. If one or more compatible execution environments is found, one of the execution environments is selected for executing the application. If no compatible environment is found, an alert is issued when the application is executed. The compatible execution environment information may be a prioritized list of execution environments. In such a case, the highest priority execution environment found on the system is selected. Searching the system's files may include searching within a set of directories specified in a PATH variable of the system. In one embodiment of particular significance, the application is further characterized as a Java® application and the execution environments consist of Java® runtime environments. The compatible execution environments may be provided via a JAR file manifest in the case of a standalone application or via a Java® Network Launch Protocol (JNLP) file when the application is launched via a network using Java® Web Start.

BRIEF DESCRIPTION OF THE DRAWINGS

Other objects and advantages of the invention will become apparent upon reading the following detailed description and upon reference to the accompanying drawings in which:

FIG. 7 illustrates an exemplary JNLP suitable for use in the present invention.

Figure 1:
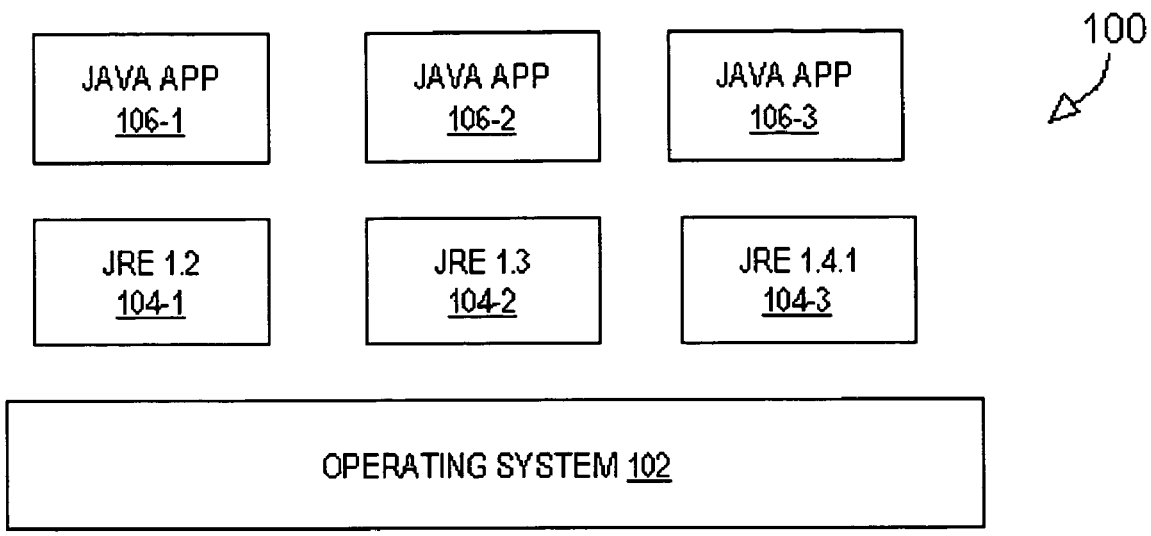
FIG. 1 is a conceptualized block diagram of a data processing system suitable for use with the present invention.
Figure 2:
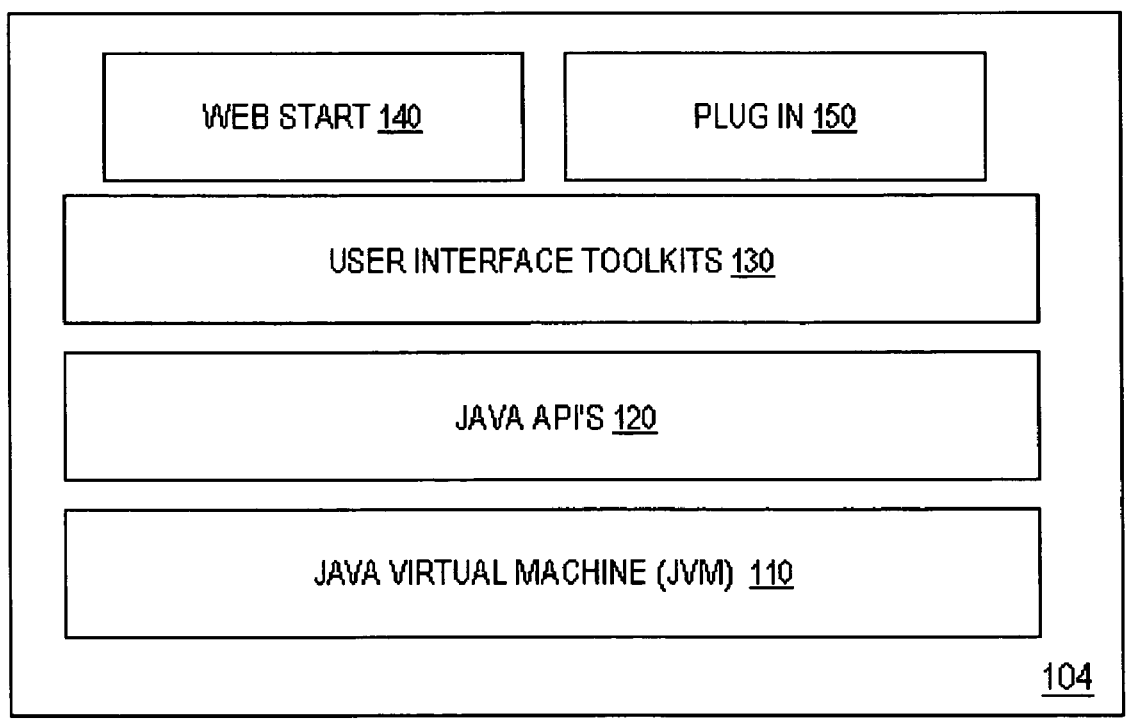
FIG. 2 is a block diagram detailing selected elements of a Java® run time environment of FIG. 1.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Generally speaking, the invention addresses the selection of an appropriate environment for executing an application program. The primary illustration of the invention described herein is directed to a system and method for selecting an appropriate Java® runtime environment (JRE) for a given Java® application, whether the application is executed as a standalone application (local execution) or over a network via an agent such as Java® Web Start. The invention uses a file parser and a directory path search engine to determine the best execution environment for an application. The parser is responsible for extracting information indicating compatible execution environments (i.e., runtime environment(s) on which the application is intended to execute). The search engine receives the extracted information from the parser and uses the information to search the system to determine the best execution environment. By employing the parser and the search engine, the invention beneficially ensures that applications will either execute in the most appropriate environment or alert the user that no compatible execution environment could be found. The invention improves on a conventional system in which the first-detected execution environment is used to execute an application even if that environment is sub-optimal or incompatible with the environment for which the application was originally intended.

Portions of the present invention may be wholly or largely implemented as a set of computer executable instructions (computer software) for selecting the best runtime environment for an application. In such embodiments, the computer executable instructions are typically stored on a permanent storage device such as a hard disk, magnetic tape, CD ROM, flash memory device, and the like. During times when portions of the software are being executed, the instructions may reside in a dynamic storage element such as a system memory or an internal or external cache memory.

Figure 3:
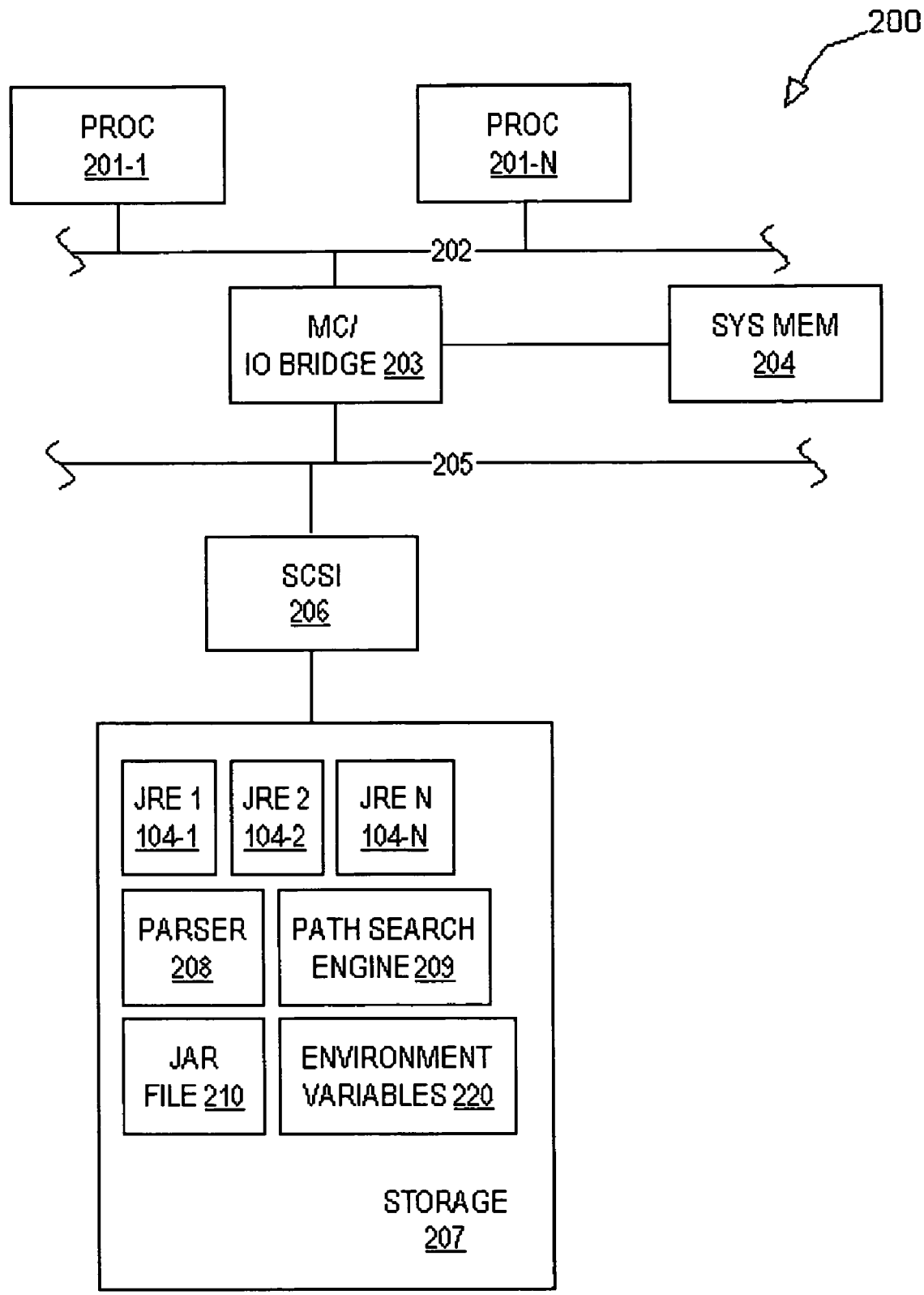
FIG. 3 is a block diagram emphasizing the hardware architecture of a representative system according to the present invention.
Figure 4:
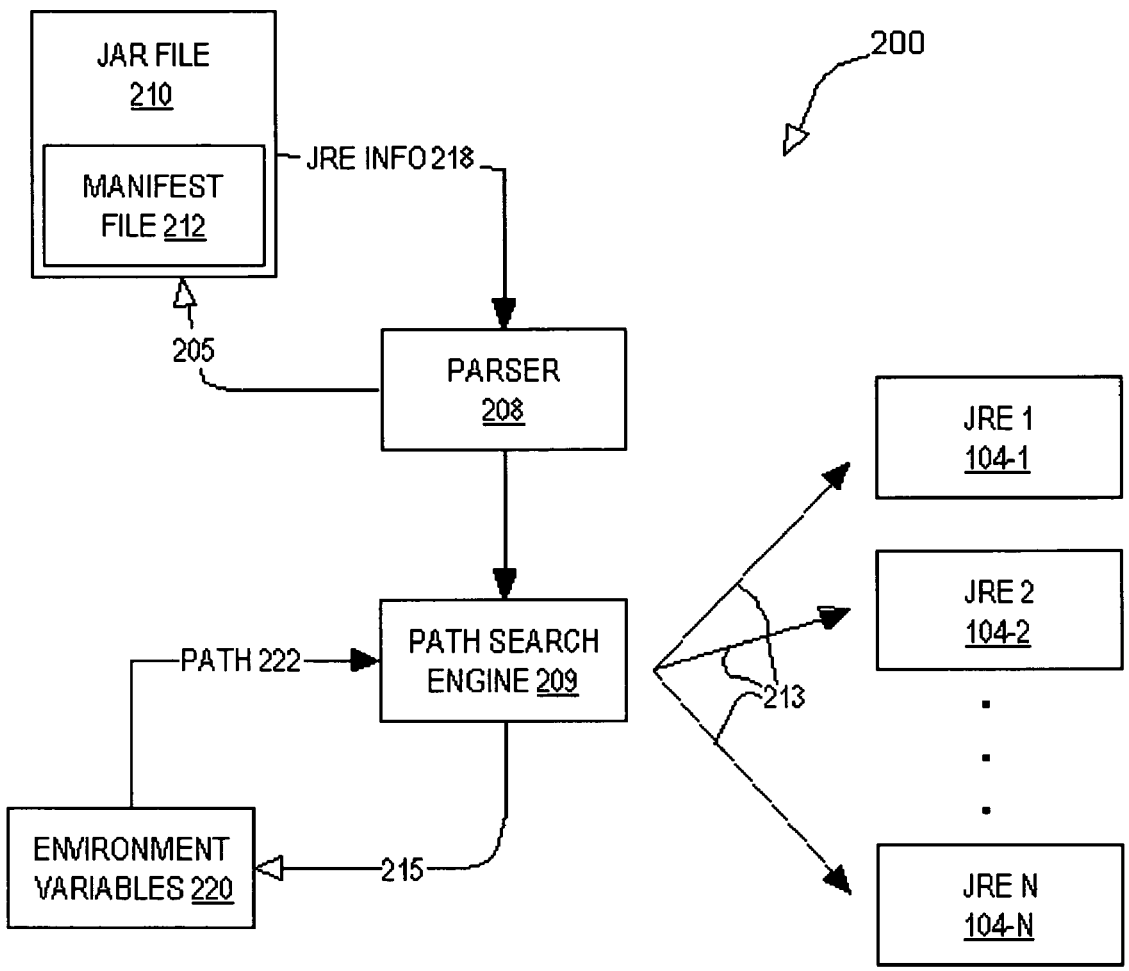
FIG. 4 illustrates a system and method for selecting an appropriate or compatible run time environment for executing an application program in a standalone mode.

Referring now to FIG. 3 and FIG. 4, selected hardware and software elements of a data processing system 200 and its method of use are depicted to illustrate the application of the present invention for the case of a standalone Java® application.

The depicted embodiment of system 200 is a symmetric multi-processor (SMP) data processing system that will be familiar to those in the field of microprocessor-based data processing system design. As such, data processing system 200 includes multiple general purpose microprocessors 201-1 through 201-N (generically or collectively referred to herein as processor(s) 201) that share a system bus 202. A memory controller/IO bridge 203 connected to system bus 202 enables processors 201 to access a system memory 204 and an I/O or peripheral bus 205. Peripheral bus 205, for example, maybe implemented as the well-known Peripheral Components Interface (PCI) bus. A Small Systems Controller Interface (SCSI) adapter 206 connects non-volatile (disk) storage 207 to peripheral bus 205. In the depicted embodiment, storage 207 includes software or code sections, such as multiple JREs 104, a parser application 208, a path search engine 209, a JAR file 210, and environment variables 220. During certain periods, portions of any of the depicted elements in storage 207 may also reside in system memory 204 and/or in a cache memory (not depicted) of one or more of the processors 201.

Typically, a standalone Java® application is downloaded from a web server using a Java® archive (JAR) file such as JAR file 210. JAR file 210 as implemented according to the present invention complies with the *JAR File Specification* from Sun Microsystems (hereinafter "the JAR specification")

while incorporating additional elements to facilitate the selection of an appropriate run time environment. In compliance with the JAR specification, JAR file 210 includes a collection of class files and any extensions (not shown) necessary to execute the application. Because class files are typically compressed within JAR file 210, JAR file 210 is suitable for packaging and delivering Java® applications.

In addition to its class files, the depicted embodiment of JAR file 210 includes a JAR manifest file 212. JAR manifest file 212, as described in the JAR Specification, has a main section 214 and may include one or more individual sections (which are not shown because the relevant features of the invention are preferably implemented in main section 214 and because the format and content of any individual sections in JAR manifest file 212 are fully described in the JAR specification). Main section 214 contains information such as manifest version information 231 indicating the manifest file version, vendor/version information 232 indicating the version and vendor of the Java implementation used to generate the manifest file, and "Main class" information 233 indicating the relative path of the main application class which the launcher will load at startup time.

Figure 5:
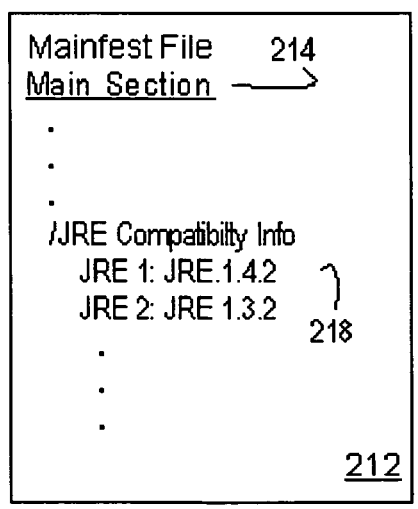
FIG. 5 is a conceptual depiction of a manifest file within a JAR file suitable for use in the system of FIG. 4.

JAR manifest file 212 as depicted in FIG. 5 further includes JRE compatibility information 234. JRE compatibility information 234 indicates a list of JRE vendors and JRE versions that are compatible with the application. (If the application developer has not provided JRE compatibility information with the application, the highest version of the JRE in the system will be the preferred JRE). In the depicted embodiment, JRE compatibility information 234 is a prioritized listing of compatible JREs. Thus, the depicted example of JRE compatibility information 234 includes a set of entries 235-1, 235-2, through 235-n. Each entry 235 indicates a JRE version and (optionally) vendor. Like most other entries in JAR file manifest, each JRE compatibility entry 235 is formatted as a name-value pair. Name-value pairs, derived from Internet Engineering Task Force (IETF) RFC 822 (*Standard for the Format of ARPA Internet Text Messages*) refer to a simple format for specifying parameter values in which text indicating a parameter name is followed by a colon (:), a space, and text indicating the parameter's value. The identification of compatible JREs in manifest entries 235 in addition to identifying a JRE version number, may also optionally identify a vendor name, an operating system name, or a particular architecture. JRE compatibility information 234, as depicted in FIG. 5, includes a first entry 235-1 specifying a JRE version number only. A second entry 235-2 indicates a JRE version as well as a vendor. A third entry 235-n indicates a JRE version number, a vendor, and an operating system. The interpretation of this example of compatibility information 234 is that the application is compatible with and prefers to execute under any implementation of JRE version 1.4.2 (entry 235-1) without regard to vendor or operating system. If JRE 1.4.2 is not available, compatibility entry 235-2 indicates that JRE 1.3.2 may be used if the vendor is Sun Microsystems. Finally, entry 235-n indicates that JRE 1.2.1 is compatible if the vendor is Sun Microsystems and the operating system is Linux.

Returning to FIG. 4, parser 208 extracts the JVM compatibility information 234 from manifest file 212 and passes it to directory path search engine 209. Directory path search engine 209 then accesses (215) system environment variables 220 to retrieve a system PATH variable 222. Because system environment variables generally and the system PATH variable in particular are environmental variables, any application can invoke an operating system dependent command to access them.

PATH variable 222, as stated above, includes a list of directory paths. Path search engine 209 uses PATH variable 222 and JRE compatibility information 234 to begin searching (213) within the PATH-specified directories for the most desirable or most compatible JRE (i.e., the JRE that matches the highest priority entry 235 within JRE compatibility information 234). When path search engine 209 discovers a JRE while searching through the PATH-specified directories, path search engine 209 will determine if the discovered JRE is a compatible JRE by comparing the version, vendor, operating system, etc. of the discovered JRE with entries 235 in compatibility information 234.

If a JRE discovered by path search engine 209 matches or satisfies the first entry 235-1 in compatibility information 234 (i.e., the "most" compatible JRE specified by the application's developer), the directory path in which the JRE was discovered is then saved so that, when the application is subsequently executed, the discovered JRE is invoked. If a JRE discovered by path search engine 209 matches an entry 235 other than the first entry 235-1 in compatibility information 234, the corresponding directory path is saved until path search engine 209 searches all directories specified in PATH variable 222. When path search engine 209 exhausts all of the PATH-specified directories, engine 209 will either return the directory path of the highest priority JRE or indicate that no compatible JRE was found. In the event that search engine 209 cannot find a compatible JRE, system 200 will issue an error message to the user. In some embodiments, the system may attempt to bypass the error by identifying any JREs that were found by search engine 209 (i.e., JREs that were not listed in JRE compatibility information 234) and prompting the user to indicate whether he/she wishes to execute the application using one of the identified JREs. The error message may also prompt the user for a location (URL for example) from which at least one of the compatible JREs can be downloaded.

In one embodiment, parser 208 and directory path search engine 209 execute as described above each time the application is executed. While this embodiment implies additional processing overhead, it assures that any recent JRE installations are considered as candidates for executing the application. In another embodiment, parser 208 and directory path search engine 209 are executed a single time for each application when the application (i.e., the JAR file 210) is first retrieved. Search engine 209, in this case, may conclude its search by associating the application with the highest priority JRE it was able to find. This association between an application and a JRE may be recorded in a local file cache or in some other manner suitable for enabling the application to locate the information at run time. This embodiment improves the execution performance by eliminating run-time directory searching, but may result in execution of an application on lower priority JRE or even failure after a preferred JRE has been installed or uninstalled.

Figure 6:
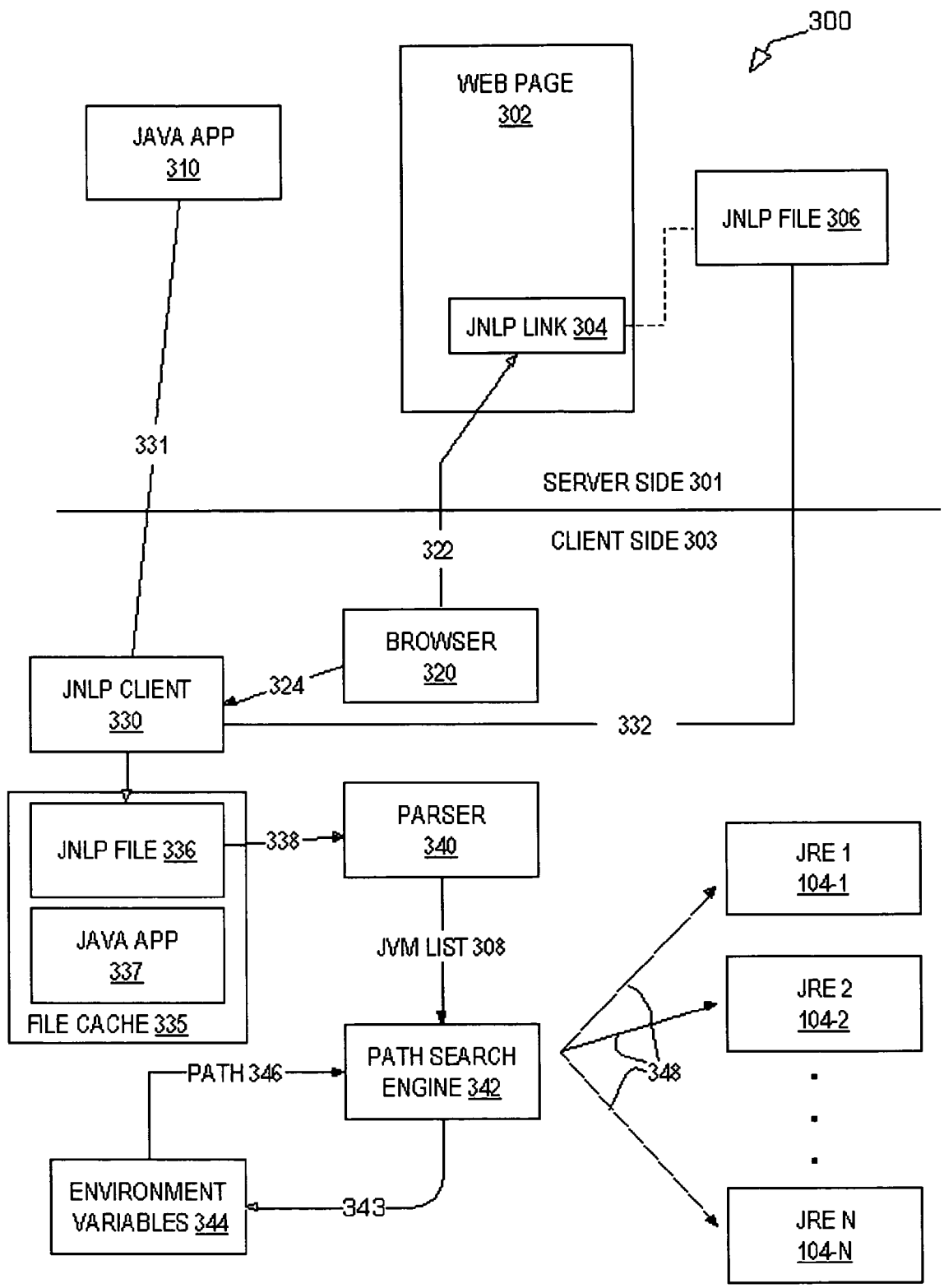
FIG. 6 illustrates a system and method for selecting an appropriate or compatible run time environment for executing an application program via a network.

Referring now to FIG. 6, selected elements of a data processing network according to one embodiment of the present invention are depicted to emphasize use of the present invention with distributed applications that are executed via a network. The depicted embodiment illustrates a network 300 and a method of using network 300 to identify the most appropriate run time environment for a Java® application invoked with Java® Web Start using JNLP. Java® Web Start is a helper application associated with a standard Web browser.

The depicted elements of network 300 are shown as being on either a server side 301 or a client side 303 of the network 300. A developer wishing to make its application available over a network creates a Web page or Web Start panel 302 that includes a link 304 (referred to herein as a JNLP link) that points to or identifies a JNLP file 306. When a user clicks (as represented by reference numeral 322) on a link, such as link 304 that points to a JNLP file, such as file 306, browser 320 responds by launching (324) JNLP client 330 (also referred to as Java® Web Start). JNLP client 330 then automatically downloads (332) JNLP file 306 and a Java® application identified therein (at block 331). In the illustrated example, JNLP file 306 includes an entry containing the URL of Java® application 310. Thus, JNLP client 330 downloads (331), JNLP file 306 and Java® application 310 (at block 331) and stores or caches the downloaded copies of the files (336, 337) in a local file cache 335. It should be noted that application 310 and JNLP file 306 need not reside on a common server.

Prior to executing downloaded application 310, file parser 340 extracts (338) JRE compatibility information for the application from the cached JNLP file 336. The JNLP specification requires the inclusion of such information within a JNLP file such as JNLP file 306 or cached JNLP file 336, which are collectively referred to herein as JNLP file 306/336. Referring to FIG. 7, one example of JNLP file 306/336 is presented for illustrative purposes. In the depicted example, JNLP file 306/336 includes a resource section 307 that contains JRE compatibility entries 308-1, 308-2, and 308-3. JRE compatibility entries 308 are analogous to JRE compatibility entries 235 in the JAR manifest file 212 described above with reference to FIG. 5. More specifically, each JRE compatibility entries 308 identifies a JRE that on which the application is supported. When multiple compatibility entries 308 are included in JNLP file 306/336, the ordering of entries 308 indicates their relative priorities. Thus, in the depicted example, JRE compatibility entry 308-1 has the highest priority such that, the JRE identified by entry 308-1 (i.e., JRE Version 1.4) should be selected over the JREs specified by the other compatibility entries 308 when multiple JREs are present.

Like the entries 235 in JRE compatibility information 234 described above, JRE compatibility entries 308 specify a JRE version and may include additional information to specify a particular vendor. As depicted in FIG. 7, for example, compatibility entry 308-1 specifies JRE version 1.4 without specifying a vendor or any other information such as an operating system and/or a hardware platform. This entry conveys that the developer has determined that the application is supported by all JRE versions 1.4 regardless of vendor etc. Compatibility entry 308-2 similarly conveys that the application is compatible with all JRE versions 1.3.2 while entry 308-3 indicates that only a specific vendor's version of JRE 1.3.1 supports the application.

Returning to FIG. 6, parser 340 reads (338) JRE compatibility entries 308 from the cached copy 336 of JNLP file 306 and communicates the information contained in entries 308 to path search engine 342. In one implementation, parser 340 is able to locate and read entries 308 by their unique identifiers. The JNLP specification reserves the "js2e version" identifier for the specific purpose of indicating the JRE versions on which an application is supported. By performing a simple text search for these "js2e version" identifiers, parser 340 is able to identify a list of compatible JREs for the application.

Path search engine 342 then invokes a system command (that is dependent upon the operating system) to retrieve (343) a PATH variable 346 from a set of system environment variables 344. System environment variables 344, as their name implies, are variables maintained by the operating system to convey information about global parameters (i.e., parameters that may be read and/or used by the operating system as well as any application program). PATH variable 346 is a system environment variable 344 that includes a set or list of directory paths (not shown). PATH variable 346 is commonly used to define a set of directories in which application programs may be found. When a user enters a command (e.g., abc.exe in a Windows® environment), the operating system will attempt to locate and execute the file abc.exe by looking in those directories specified in PATH variable 346. Path search engine 343 uses PATH variable 346 to define limits on where it will search for a compatible JRE. In the absence of a PATH variable 346, path search engine 343 would have to search through an entire hard disk or similarly large storage device when attempting to locate compatible JREs. PATH variable 346 is preferably updated each time a new JRE version is installed to indicate the directory path where the new JRE is located. Responsibility for updating PATH variable 346 when a new JRE is installed rests with the installer.

Using JRE entries 308, path search engine 342 then searches (348) for compatible JREs in the directories (not shown) specified in PATH variable 346 analogous to the manner in which path search engine 209 searches for a compatible JRE as described above with respect to FIG. 4. In one embodiment, the directory path search engine 342 and the parser 340 comprise portions of JNLP client 330.

By providing a mechanism for automated detection of the best available JRE and notification to the user when no compatible JRE can be found, the present invention addresses a potentially significant and widespread shortcoming of conventionally enabled Java®-based systems. Using a list of compatible JREs provides flexibility and control to the application developer, who can now specify exactly which JRE(s) are required to execute. In addition, the use of the PATH to provide boundaries on the location(s) where JREs may be found beneficially improves efficiency by limiting the amount of disk space that must be searched. A measure of security and reliability is also provided by the use of the PATH variable in finding compatible JREs. Appropriate modification of the PATH variable, on the other hand, implies a controlled and more trustworthy installation.

It will be apparent to those skilled in the art having the benefit of this disclosure that the present invention contemplates a mechanism for securing a pair of mated cable connectors. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A method of executing an application on a data processing system having a processor and at least one storage device connected to the processor, the method comprising:

interpreting byte codes of an application by a virtual machine of the data processing system, the application being of a designated type, the virtual machine being stored on the at least one storage device to enable execution of the designated type by the processor independently of a kind of the processor and a kind of operating system software of the data processing system, the data processing system having a plurality of runtime environments for the designated type, each runtime environment including instructions stored on the least one storage device for execution by the processor to implement the virtual machine on the data processing system, the storage device having stored thereon a certain program for controlling the processor to select one of the runtime environments for the application, and the processor being operative with the certain program to execute the certain program for performing:

a) parsing files of the data processing system's at least one storage device and retrieving information from the parsed files, the retrieved information being indicative of a set of compatible execution environments, each such compatible execution environment being suitable for executing the application;

b) searching the information retrieved from the parsed files of the data processing system's at least one storage device to locate any compatible execution environments installed on the data processing system;

c) responsive to locating at least one compatible execution environment installed on the data processing system, selecting a compatible execution environment from the located execution environments and executing the application within the selected execution environment; and d) responsive to failing to locate a compatible execution environment, generating a user detectable alert, the retrieving of the compatible execution environment information in a) being further characterized as retrieving prioritized execution environment information, and the selecting an execution environment in c) being further characterized as selecting, from the set of located execution environments, the execution environment having the highest priority, and the searching in b) comprising searching within a set of directories specified in a PATH variable of the data processing system, and the retrieving information in a) comprising retrieving a list of compatible runtime environments for the designated type from a manifest file of an archive associated with the application and from a network launch protocol file associated with the application.

2. The method of claim 1, said retrieving information and searching of the retrieved information parsed from the data processing system's files occurring in response to downloading the application via a network such that the selected execution environment is identified prior to executing the application.

3. The method of claim 1, said retrieving information and searching of the retrieved information parsed from the data processing the data processing system's files occurring each time the application is executed.

4. A data processing system comprising:
a processor; and
at least one storage device connected to the processor, the at least one storage device having stored thereon an operating system and a virtual machine program for controlling the processor, and the processor being operative with the virtual machine program and the operating system to execute the virtual machine program for performing:
interpreting byte codes of an application, the application being of a designated type, the virtual machine enabling execution of the designated type by the processor independently of a kind of the processor and a kind of the operating system software of the data processing system, the data processing system having a plurality of runtime environments for the designated type, each runtime environment including instructions stored on the least one storage device for execution by the processor to implement the virtual machine on the data processing system, the storage device having stored thereon a certain program for controlling the processor to select one of the runtime environments for the application, and the processor being operative with the certain program to execute the certain program for performing:

a) parsing files of the data processing system's at least one storage device and retrieving information from the parsed files, the retrieved information being indicative of a set of compatible execution environments, each such compatible execution environment being suitable for executing the application;

b) searching the information retrieved from the parsed files of the data processing system's at least one storage device to locate any compatible execution environments installed on the data processing system;

c) responsive to locating at least one compatible execution environment installed on the data processing system, selecting a compatible execution environment from the located execution environments and executing the application within the selected execution environment; and d) responsive to failing to locate a compatible execution environment, generating a user detectable alert, the retrieving of the compatible execution environment information in a) being further characterized as retrieving prioritized execution environment information, and the selecting an execution environment in c) being further characterized as selecting, from the set of located execution environments, the execution environment having the highest priority, and the searching in b) comprising searching within a set of directories specified in a PATH variable of the data processing system, and the retrieving information in a) comprising retrieving a list of compatible runtime environments for the designated type from a manifest file of an archive associated with the application and from a network launch protocol file associated with the application.

5. The system of claim 4, the method implemented by the computer executing the certain program comprising:
prompting a user to execute the application using one of the identified execution environments following said failing to locate any compatible execution environments on the system.

6. The system of claim 4, the method implemented by the computer executing the certain program comprising:
obtaining a compatible execution environment via a network to which the system is connected following said failing to locate any compatible execution environments on the system.

7. The system of claim 4, the searching in b) being limited to a specified set of directories.

8. A computer program product for selecting a runtime environment in a data processing system having at least one storage device, the at least one storage device having stored thereon an operating system and a virtual machine program for controlling a processor of the data processing system, and the processor being operative with the virtual machine program and the operating system to execute the virtual machine program for interpreting byte codes of an application, the application being of a designated type, the virtual machine enabling execution of the designated type by the processor independently of a kind of the processor and a kind of the operating system software of the data processing system, the data processing system having a plurality of runtime environments for the designated type, each runtime environment including instructions stored on the least one storage device for execution by the processor to implement the virtual machine on the data processing system, the computer program product including a computer readable medium having instructions stored thereon for execution by the processor of the data processing system, the instructions, when executed by the data processing system, causing the computer to implement a method for selecting a runtime environment comprising:

a) parsing files of the data processing system's at least one storage device and retrieving information from the parsed files, the retrieved information being indicative of a set of compatible execution environments, each such compatible excution environment being suitable for executing the application;
b) searching the information retrieved from the parsed files of the data processing system's at least one storage device to locate any compatible execution environments installed on the system;
c) responsive to locating at least one compatible execution environment installed on the data processing system, selecting a compatible execution environment from the located execution environments and executing the application within the selected execution environment; and
d) responsive to failing to locate a compatible execution environment, generating a user detectable alert, the retrieving of the compatible execution environment information in a) being further characterized as retrieving prioritized execution environment information, and the selecting an execution environment in c) being further characterized as selecting, from the set of located execution environments, the execution environment having the highest priority, and the searching in b) comprising searching within a set of directories specified in a PATH variable of the data processing system, and the retrieving information in a) comprising retrieving a list of compatible runtime environments for the designated type from a manifest file of an archive associated with the application and from a network launch protocol file associated with the application.

9. The computer program product of claim 8, said retrieving information and searching the data processing system's files occurring in response to downloading the application via a network such that the selected execution environment is identified prior to executing the application.

10. The computer program product of claim 8, said retrieving information and searching the data processing system's files occurring each time the application is executed.

11. The computer program product of claim 8, the instructions, when executed by the data processing system, further causing the computer to implement a method for selecting a runtime environment comprising: prompting a user to execute the application using one of the identified execution environments following said failing to locate any compatible execution environments on the data processing system.

* * * * *